United States Patent [19]
Tazawa

[11] Patent Number: 4,989,150
[45] Date of Patent: Jan. 29, 1991

[54] INJECTOR DIAGNOSIS SYSTEM

[75] Inventor: Kazuyuki Tazawa, Tokyo, Japan

[73] Assignee: Fuji Jukogyo Kabushiki Kaisha, Tokyo, Japan

[21] Appl. No.: 483,862

[22] Filed: Feb. 23, 1990

[51] Int. Cl.[5] ........................................ B60K 41/02

[52] U.S. Cl. ........................ 364/431.03; 364/431.09; 73/119 A

[58] Field of Search ..................... 364/431.03, 431.04, 364/431.05, 431.09; 73/117.2, 117.3, 118.2, 119 A

[56] References Cited

U.S. PATENT DOCUMENTS

| | | | |
|---|---|---|---|
| 4,050,297 | 9/1977 | Pettingell et al. | 73/117.2 |
| 4,559,914 | 2/1985 | Flaig et al. | 73/119 A |
| 4,788,858 | 12/1988 | Liebermann | 73/119 A |
| 4,903,669 | 2/1990 | Groff et al. | 73/119 A |

*Primary Examiner*—Parshotam S. Lall
*Assistant Examiner*—Tyrone Queen
*Attorney, Agent, or Firm*—Beveridge, DeGrandi & Weilacher

[57] ABSTRACT

There is provided an injector diagnosis system for a motor vehicle having a plurality of injectors mounted on an engine and a control unit for generating a pulse signal to control the injectors. A sensor detects a current which is supplied to the injectors when the pulse signal is generated. A calculator calculates an injector load current on the basis of the current detected by the sensor. A diagnosis device determines whether the injectors are normal by comparing the injector load current and a reference current. A judging device judges whether a fuel cut condition is satisfied on the basis of signals from various sensors which detect driving states. And an instruction device operates the diagnosis device to stop the determination when the judging device judges that the fuel cut condition is satisfied, whereas the determination is executed when the judging device judges that the fuel cut condition is not satisfied.

5 Claims, 6 Drawing Sheets

INJECTOR DIAGNOSIS SYSTEM

BACKGROUND OF THE INVENTION

The present invention relates to an injector diagnosis system to diagnose an injector of a vehicle which is controlled by an electronic control unit (hereinafter abbreviated in an ECU) mounted on the vehicle.

In an air-fuel ratio control system, the ECU comprising a microcomputer which calculates a fuel injection quantity corresponding to an intake air quantity to supply a control signal to the injector so as to control the air-fuel ratio.

The control signal to the injector is usually a pulse signal synchronized with the rotation of an engine. By controlling the fuel injection time of the injector, that is, the width of the pulse signal, the air-fuel ratio is controlled.

Accordingly, when the injector malfunctions, the fuel quantity matching the intake air quantity is not injected. This causes the air-fuel ratio to be lean or rich. As a result, the exhaust emission is deteriorated, while engine output and fuel consumption are lowered.

For that reason, the ECU has recently been provided with the function to diagnose if an electric circuit having loads such as actuators normally operates in dependency on the control signal.

For example, Japanese Patent Laid-Open No. 63-27769 (1988) discloses the technology to detect the current flowing through the power line of a plurality of electric circuits, by means of a current sensor which is composed of a shunt and provided in the line so as to detect if the object to be controlled is in the normal operating state by verifying the detection signal of the current sensor with the control signal at that time by means of a detection circuit.

However, in the case of deceleration or engine overrunning, the fuel is cut off to the injector for fuel saving or protection of a catalytic convertor or the engine. When the fuel is cut off, a narrow width-pulse signal is generated to make the fuel injection time (or injection quantity) be zero or minimize it. Accordingly, the load current of the injector is made zero or minimized.

This means that the pulse signal is generated to detect the load current of the injector, even if the fuel is cut off. The judgement is thus erroneously made as if an abnormal current is supplied to the injector.

SUMMARY OF THE INVENTION

The object of the present invention is to provide an injector diagnosis system capable of preventing erroneous judgement when the fuel is cut off.

According to the present invention, there is provided an injector diagnosis system for a motor vehicle having a plurality of injectors mounted on an engine and a control unit for generating a pulse signal to control the injectors.

The injector diagnosis system consists of a sensor for detecting a current which is supplied to the injectors when the pulse signal is generated, a device for generating a reference current, a diagnosis device for determining whether the injectors are normal by comparing the injector load current and the reference current, a judging device for judging whether a fuel cut condition is satisfied on the basis of signals from various sensors for detecting driving states and an instruction device for operating the diagnosis device to stop the determination when the judging device judges that the fuel cut condition is satisfied, whereas the determination is executed when the judging device judges that the fuel cut condition is not satisfied.

The other objects and features of the present invention will become understood from the following description with reference to the accompanying drawings.

BRIEF DESCRIPTION OF THE DRAWINGS

In the figures.

Figure 1:
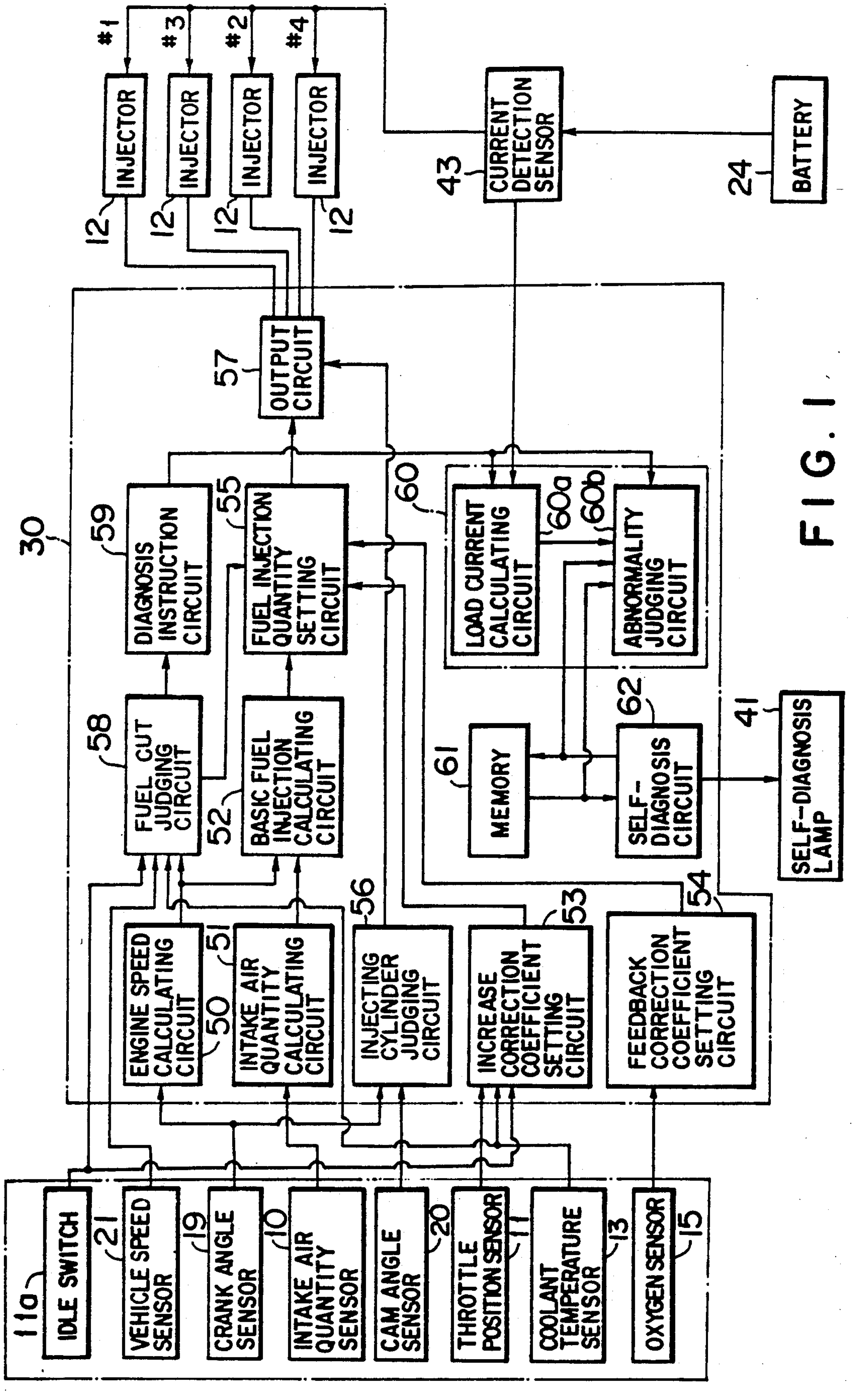
FIGS. 1 through 6 show an embodiment according to the present invention, respectively.
Figure 2:
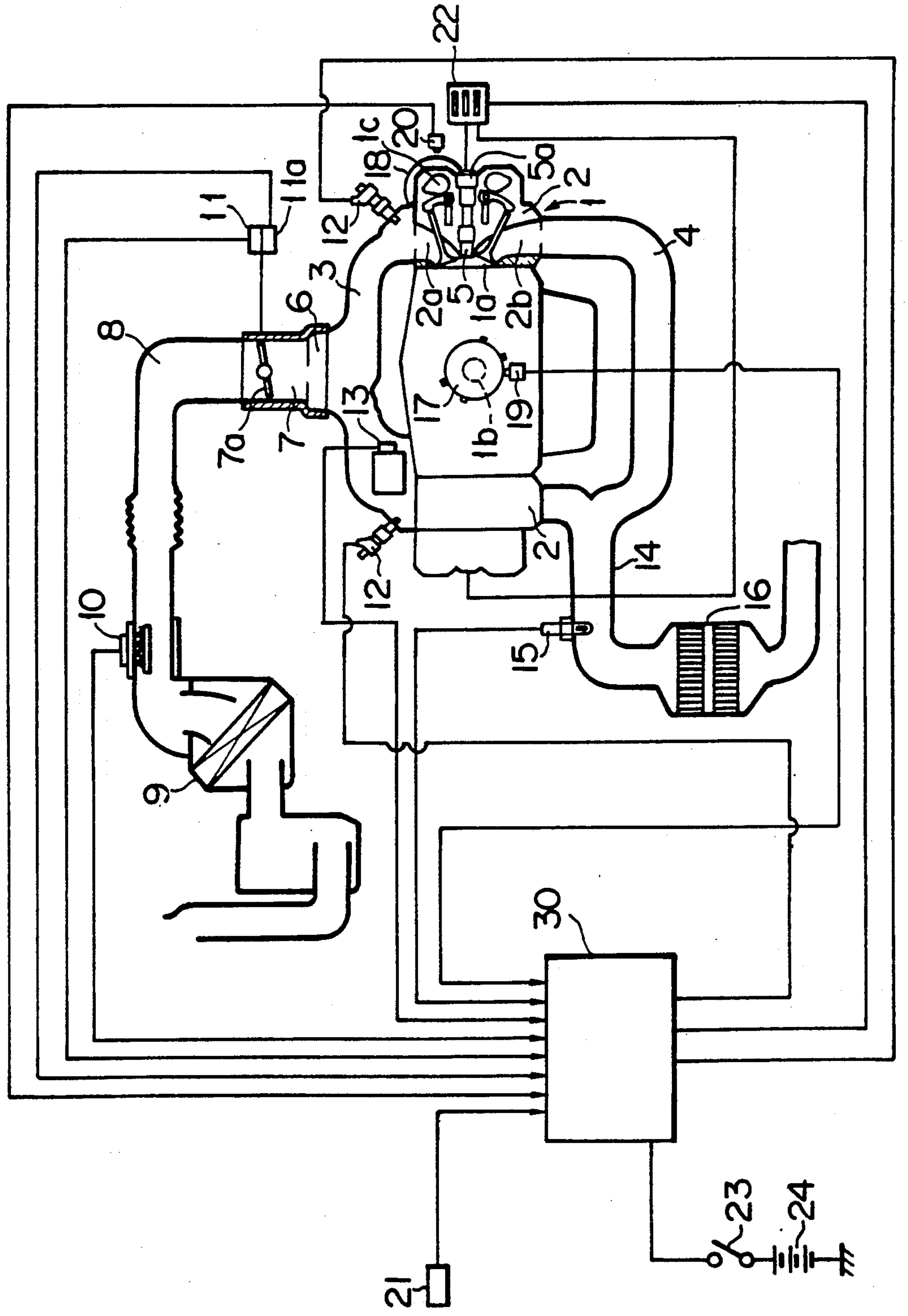
Figure 3:
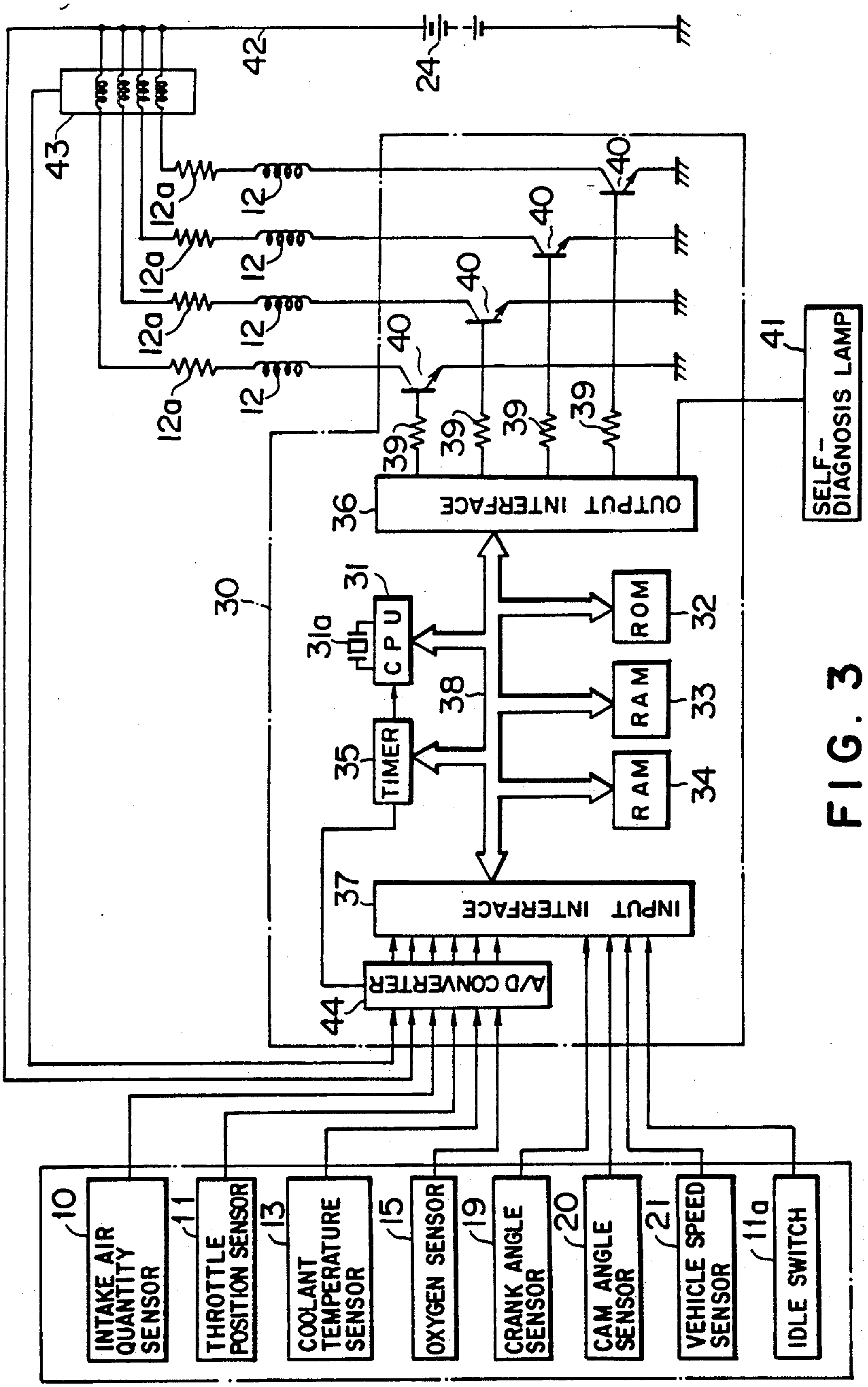
Figure 4A:
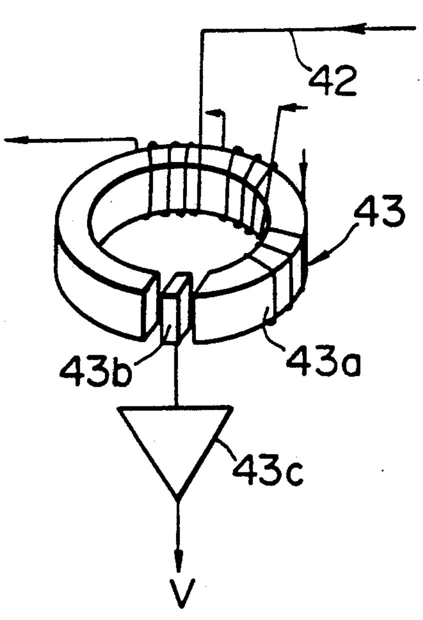
Figure 4B:
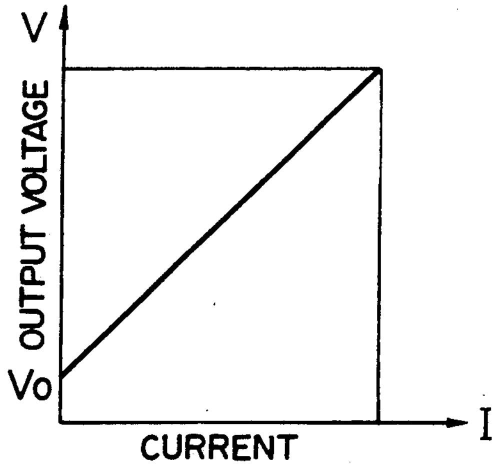
Figure 5:
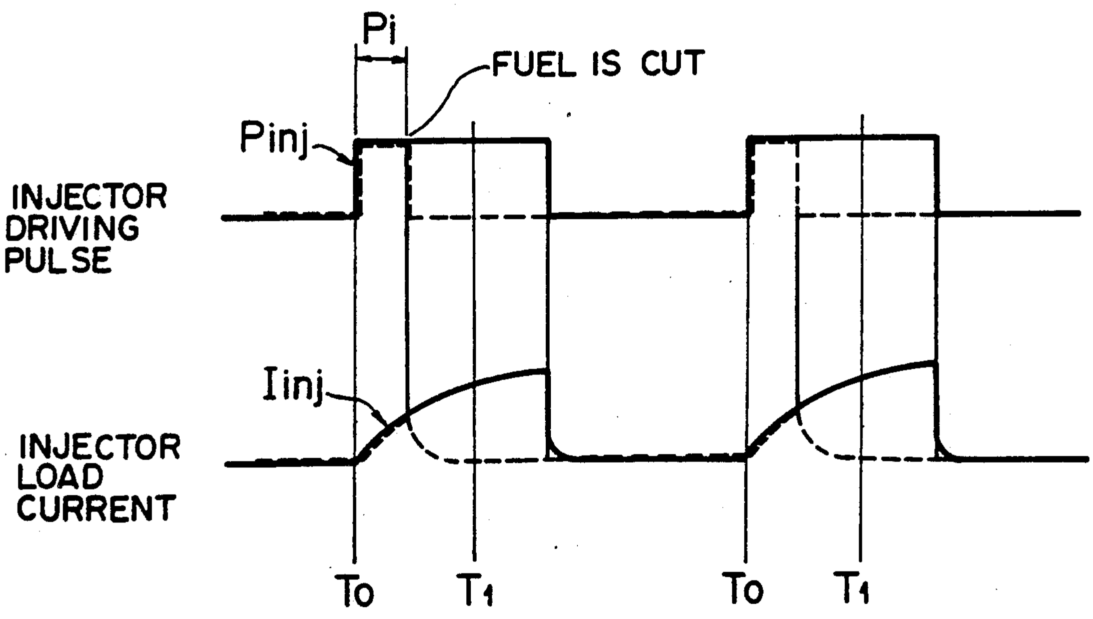

In the figures,

FIG. 1 is a schematic block diagram relating to a diagnosis system;

FIG. 2 is a schematic diagram of an engine control system;

FIG. 3 shows a circuit diagram of FIG. 1;

FIG. 4A is an explanatory view of a current detection sensor;

FIG. 4B is a characteristic of the current detection sensor;

FIG. 5 shows waveforms of a control signal and an injector load current; and

Figure 6A:
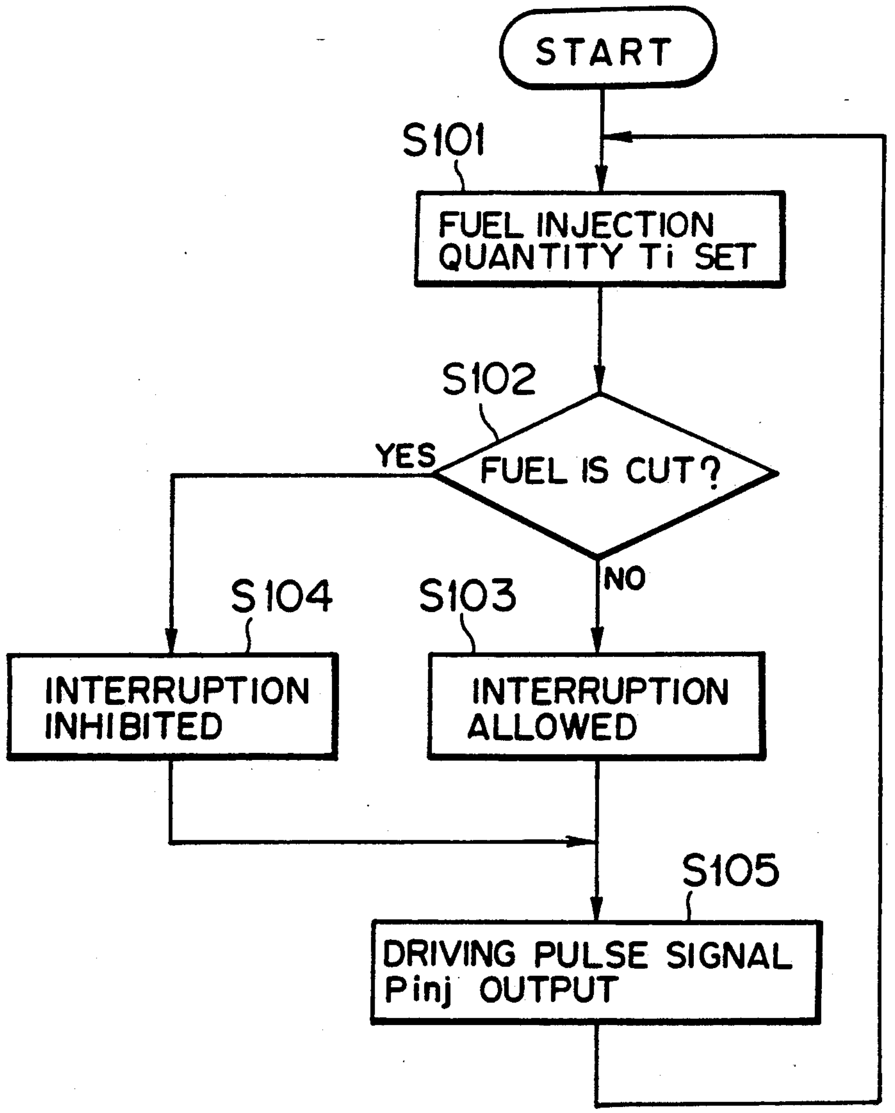
Figure 6B:
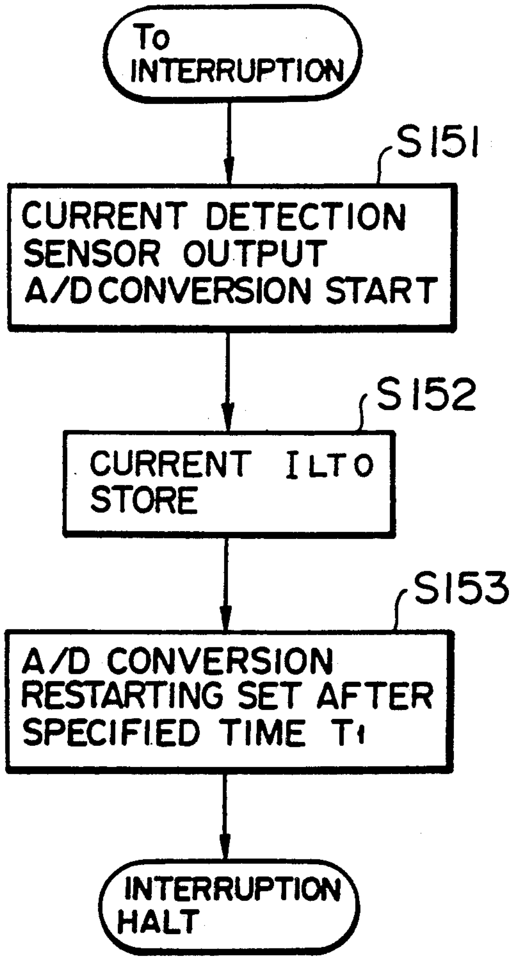
Figure 6C:
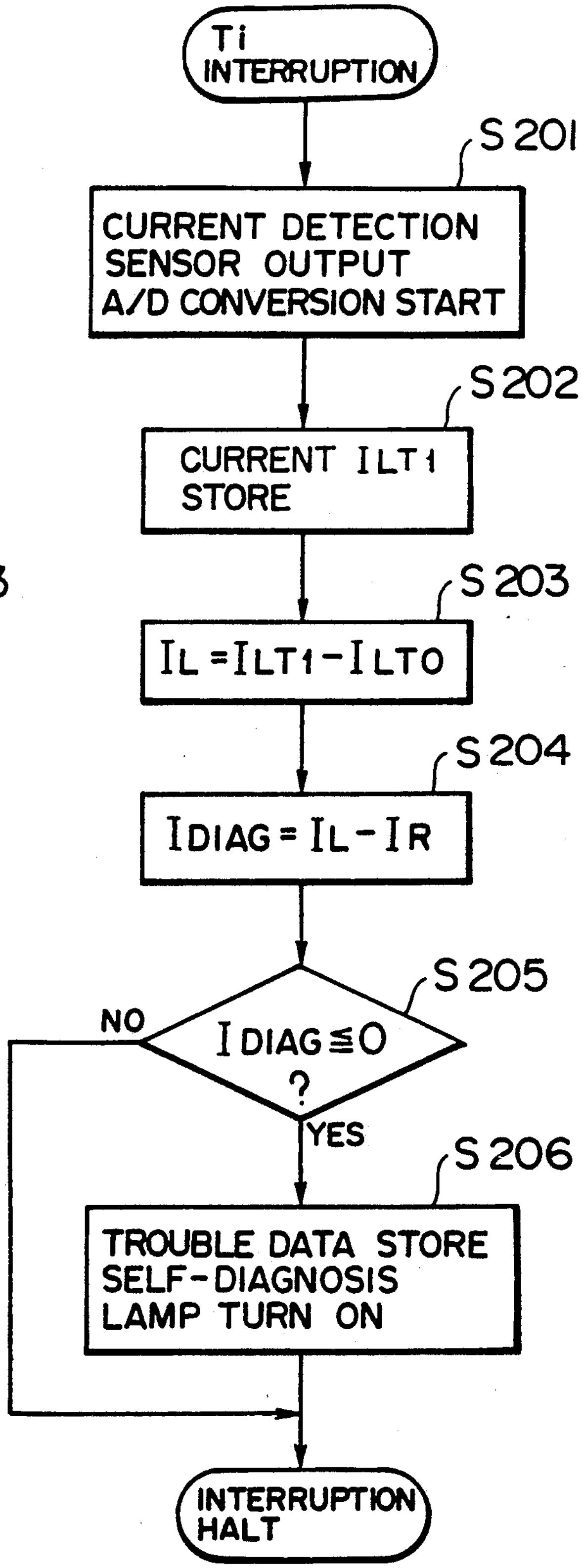

FIGS. 6A, 6B and 6C are flow charts showing operation procedures of the diagnosis system.

DETAILED DESCRIPTION OF THE PREFERRED EMBODIMENTS

The present invention will now be described in detail, with reference to the accompanying drawings.

Referring to FIG. 2, a cylinder head 2 of an engine 1 comprises an intake port 2*a* and an exhaust port 2*b* with which an intake manifold 3 and an exhaust manifold 4 are communicated, respectively. Furthermore, a spark plug 5 is exposed in a combustion chamber 1*a*. And an ignition coil 5*a* is provided to supply the power to the spark plug 5.

A throttle chamber 7 is communicated with the upstream side of the intake manifold 3 through an air chamber 6 and also with an air cleaner 9 at the upstream side through an intake pipe 8. An intake air quantity sensor 10 (a hot film type air flow meter) is provided downstream of the air cleaner 9.

A throttle position sensor 11 and an idle switch 11*a* are provided in the throttle chamber 7 for detecting an opening degree of the throttle valve 7*a*.

An injector 12 is mounted on the intake manifold 3 upstream of each intake port 2*a* communicated with the combustion chamber 1*a* of each cylinder. A coolant temperature sensor 13 is exposed in a coolant passage (not shown) formed in the intake manifold 3. Furthermore, an oxygen sensor 15 is exposed in an exhaust pipe 14 communicated with the exhaust manifold 4. A catalytic convertor 16 is provided in the exhaust pipe 14.

A crank rotor 17 is fixed to an end of a crank shaft 1*b* and a cylinder discrimination rotor 18 is also connected to a cam shaft 1*c*. A crank angle sensor 19 is provided against the outer periphery of the crank rotor 17 and also a cam angle sensor 20 against the cylinder discrimination rotor 18.

A vehicle speed sensor 21 is connected to the input terminal of the ECU 30 with the sensors 10, 11, 13, 15, 19 and 20 and the idle switch 11*a*. Also connected to the output terminal of the ECU 30 are the injector 12 provided to each cylinder and an igniter 22 composed of transistors, which is connected to the ignition coil 5*a* provided to each cylinder. Numerals 23 and 24 denote a key switch and a battery, respectively.

As shown in FIG. 3, the ECU 30 comprises a central processing unit (CPU) 31, a read only memory (ROM) 32, a random access memory (RAM) 33, a backup RAM 34, a timer 35, an output interface 36 and an input interface 37 connected to each other via a bus line 38.

An oscillator 31*a* is connected to the CPU 31 to supply a system clock signal which is a reference timing for the CPU 31. The system clock signal is counted by a free-running counter (not shown) of the timer 35. Each reference timing is detected as a value indicated by a free-running counter.

Four transistors 40 are connected to the output interface 36 via resistors 39 and each transistor 40 is also connected to the injector 12 in each cylinder via a current limiting resistor 12*a*. Furthermore, a self-diagnosis lamp 41 is also connected to the output interface 36 for warning of abnormality of a control system.

A current detection sensor 43 is provided at a line 42 extending from a battery 24. An injector load current IL is supplied to an electric circuit having the line 42 through the current limiting resistor 12*a* and the injector 12. The current IL is directly detected by the current detection sensor 43.

Connected to the input interface 37 via an analog/digital (A/D) converter 44 are various detection means such as the intake air quantity sensor 10, the throttle position sensor 11, the coolant temperature sensor 13 and the oxygen sensor 15, which detect driving state and generate analog signals.

Also directly connected to the input interface 37 are various detection means such as the crank angle sensor 19, the cam angle sensor 20, the vehicle speed sensor 21 and the idle switch 11*a*, which generate digital signals.

The current detection sensor 43 is composed as follows and may be molded with resin as shown in FIG. 4A.

Wires are wound around a ring core 43*a* made of such as ferrite to form a transformer. A portion of the ring core 43*a* is opened to form an opening in which a Hall element 43*b* is provided, and an amplifier 43*c* is connected to the Hall element 43*b*.

The current detection sensor 43 is capable of detecting current without being directly connected to the electric circuit, so that the current is detected without adverse influence such as the variation of impedance and the decrease of the noise margin of the electric circuit.

When a control signal is supplied to the electric circuit and a current flows therethrough, a magnetic field is generated in the current detection sensor 43 due to the current. This causes a magnetic flux passes through the Hall element 43*b* by means of the transformer composed of the core 43*a* so that the Hall element 43*b* generates a voltage which is amplified by the amplifier 43*c*.

The characteristic of the current detection sensor 43 is shown in FIG. 4B. The current I and the output voltage V are almost in linear relationship. However, due to electrical characteristic of the Hall element 43*b*, some output voltage may exist as an offset voltage $V_0$ even if there is no input signals.

Fixed data, such as control programs, are stored in the ROM 32. Output data from the sensors after processing and data calculated by the CPU 31 are stored in the RAM 33. The backup RAM 34 stores trouble data regarding failure occurring in the injector 12, the ignitor 22, the sensors 10, 11, 13, 15, 19, 20, 21, the idle switch 11*a* or the control system, and is backed up by the battery 24 to maintain stored trouble data even if the key switch 23 is off.

The CPU 31 calculates various control data on the basis of the data stored in the RAM 33 and depending on the control programs stored in the ROM 32 and temporarily stores the various control data in the RAM 33 to supply control signals to electrical loads, such as the injector 12 and the ignitor 22, via the output interface 37 on the specified timings.

For example, this procedure advances as follows in case of fuel injection. First, an intake air quantity is calculated by using an output signal of the intake air quantity sensor 10. Then, the injection quantity in dependency on the intake air quantity is calculated with various correction items to set the time corresponding to the injection time in the timer 35. The pulse signal with a pulse width corresponding to the time set in the timer 35 is supplied to the injector 12 of one of the cylinders on the specified timing synchronized with the rotation of the engine based on the output signals of the crank angle sensor 19 and the cam angle sensor 20.

The CPU 31 conducts self-diagnosis as well as the calculations of the various control data and turns on (or flickers) the self-diagnosis lamp 41 to warn a driver of the abnormality.

The functional structure of the air-fuel control of the ECU 30 is described in detail.

As shown in FIG. 1, the ECU 30 comprises an engine speed calculating circuit 50, an intake air quantity calculating circuit 51, a basic fuel injection quantity calculating circuit 52, an increase correction coefficient setting circuit 53, a feedback correction coefficient setting circuit 54, a fuel injection quantity setting circuit 55, an injecting cylinder judging circuit 56, an output circuit 57, a fuel cut judging circuit 58, a diagnosis instruction circuit 59, an injector diagnosis circuit 60 composed of a load current calculating circuit 60*a* and an abnormality judging circuit 60*b*, a memory 61 (composed of the ROM 32 and the backup RAM 34) and a self-diagnosis circuit 62.

The engine speed calculating circuit 50 calculates an engine speed N on the basis of an output signal of the crank angle sensor 19. The intake air quantity calculating circuit 51 reads the output signal of the air intake quantity sensor 10 to calculate an air intake quantity Q.

The basic fuel injection quantity calculating circuit 52 calculates a basic fuel injection quantity $T_p$ ($T_p=K\times Q/N$; K being a constant) from the engine speed N and the air intake quantity Q.

The increase correction coefficient setting circuit 53 sets an increase correction coefficient COEF including various coefficients for an increase correction after idling, throttle full opening increase correction, coolant temperature correction and acceleration correction. The feedback correction coefficient setting circuit 54 sets an air-fuel ratio feedback correction coefficient on the basis of the output waveform of the oxygen sensor 15.

The fuel injection quantity setting circuit 55 corrects the basic fuel injection quantity $T_p$ by the increase correction coefficient COEF and the feedback correction coefficient to set a fuel injection quantity $T_i$ ($T_i=T_p\times COEF\times\alpha$).

The injecting cylinder judging circuit 56 counts the number of cam pulses supplied by the cam angle sensor 20 while a crank pulse is supplied and the next one follows, and judges the following cylinder which is to inject fuel on the basis of the number of cam pulses.

A specified port of the output circuit 57 is selected according to the cylinder number judgement results to generate a pulse signal with a pulse width corresponding to the fuel injection quantity $T_i$ so as to operate the injector 12 of the cylinder which is to inject fuel.

The fuel cut judging circuit 58 detects the operating condition of the idle switch 11a and compares a vehicle speed $V_s$ detected by the vehicle speed sensor 21 with a predetermined value to judge if the vehicle is in deceleration driving in a low vehicle speed range or idling state. Furthermore, the circuit 58 compares the engine speed N with a reference speed NFC for fuel cutting depending on a coolant temperature $T_w$ detected by the coolant temperature sensor 13 to judge if the fuel cutting condition is satisfied.

When the fuel cutting condition is satisfied, a fuel cut signal from the fuel cut judging circuit 58 is supplied to the fuel injection quantity setting circuit 55 to make the pulse width $P_i$ corresponding to the fuel injection quantity $T_i$ narrower, and is also supplied to the diagnosis instruction circuit 59.

If a fuel injection quantity from the injector 12 is completely zero during the deceleration driving, the supply of fuel re-injected into the intake port 2a is delayed at reacceleration. Accordingly, the pulse width $P_i$ is controlled to narrow as little fuel is injected in the deceleration driving.

When the engine speed N is higher than a maximum allowable engine speed $N_{max}$, the fuel cutting condition is judged without any condition to prevent trouble due to engine over-running. Minimum engine speed required for fuel cutting are set as the reference speed NFC and stored in the ROM 32 as a map in which the coolant temperature $T_w$ is a parameter, for example.

The diagnosis instruction circuit 59 disables interruption by the timer 35 to halt interruption processing of the injector diagnosing circuit 60, when the fuel cutting condition is satisfied at the fuel cut judging circuit 58, whereas, if not satisfied, the initiation of the interruption processing is allowed.

The load current calculating circuit 60a calculates a load current of the injector 12 based on an offset current corresponding to the offset voltage of the current detection sensor 43 and a current corresponding to an output voltage of the sensor 43 at the time when a specified time passes after beginning of the pulse signal $P_{inj}$ for the fuel injection.

As is described above, the current detection sensor 43 has little offset current (voltage $V_0$), even there is no input signals. The offset current varies due to temperature change and time of elapse, and differs due to the individual characteristics of the sensor 43. The load current calculating circuit 60a reads the output signal of the sensor 43 as the offset current when the pulse signal $P_{inj}$ is not generated and subtracts the offset current from the current at the time when a specified time passes after beginning of the pulse signal $P_{inj}$ to calculate the load current.

For example, as is shown in FIG. 5, the current $ILT_1$ corresponding to the output voltage $V_1$ of the current delection sensor 43 is sampled when the specified time $T_1$ passes after the pulse signal $P_{inj}$ towards the injector 12 is ON. The offset current $ILT_0$ corresponding to the offset voltage $V_0$ on a timing $T_0$ when the signal $P_{inj}$ is ON is subtracted from the current $ILT_1$ to calculate actual load current IL ($IL = ILT_1 - ILT_0$) of the injector 12. This procedure is repeated per pulse.

The abnormality judging circuit 60b compares the load current IL of the injector 12 calculated by the load current calculating circuit 60a with a reference current IR stored in the memory 61 to judge if the injector 12 is normal or not.

The reference current IR is stored in the memory 61 (the ROM 32) as a table with a voltage BV of the battery 24 as a parameter. When the pulse signal $P_{inj}$ is generated, the reference current IR is directly read from the table or calculated by an interpolation calculation with a battery voltage BV at that time.

The interruption processing of the injector diagnosing circuit 60 (60a, 60b) is initiated to execute diagnosis of the injector 12 response to the instruction of the diagnosis instruction circuit 59 only when fuel cutting is not executed. Accordingly, erroneous judgement due to cutting the fuel does not occur.

In case of cutting the fuel, as shown by the broken lines in FIG. 5, the pulse width $P_i$ of pulse signal $P_{inj}$ is extremely narrowed. This causes the signal $P_{inj}$ which is ON, to be OFF before the sampling time $T_1$. The load current IL of the injector 12 is calculated to $IL \leqq 0$ since the current $ILT_1$ at the time $T_1$ is substantially equal to the offset current $ILT_0$.

Accordingly, in order to avoid erroneous judgement due to cutting the fuel, the execution of the interruption processing by the timer 35 is inhibited so as to halt the diagnosis of the injector 12 by the injector diagnosis circuit 60. Then, when the fuel cutting is relieved, the diagnosis is restarted.

When the injector 12 is judged to be abnormal by the abnormality judging circuit 60b, the self-diagnosis circuit 62 supplies a trouble data to be stored to the memory 61 and also the abnormality signal to the self-diagnosis lamp 41 to be turned on (or flickered) so as to warn of the abnormality of the injector 12.

The trouble data stored in the memory 61 is read out by an external equipment, such as a vehicle diagnosis tester, connected to the ECU 30 to easily judge the abnormality of the injector 12 in a car dealer or service station.

The operation acknowledgment procedures of the injector 12 will be described according to the flow charts shown in FIGS. 6A, 6B and 6C.

First, the fuel injection quantity $T_i$ is set in a step S101 of the program shown in FIG. 6A. Then, the program moves on to a step S102 to judge if the fuel cutting condition is satisfied. If not satisfied, the program moves on to a step S103, whereas satisfied, to a step S104.

The interruption by the timer 35 is allowed in the step S103 to enable the execution of the interruption process of the fault diagnosis of the injector 12 by the injector diagnosis circuit 60, then the program moves on to a step S105.

On the other hand, if the fuel cutting condition is satisfied in the step S102, the interruption by the timer 35 is inhibited in the step S104 to halt the fault diagnosis of the injector 12, then the program moves on to the step S105.

The pulse signal $P_{inj}$ to the injector 12 of the cylinder to be operated is generated at the specified timing, then the program returns to the step S101.

If the interruption of the fault diagnosis of the injector 12 is allowed, the interruption is executed at the timing $T_0$ of the leading edge of the pulse signal $P_{inj}$ to execute the program shown in FIG. 6B. In a step S151, a trigger signal for executing A/D conversion is supplied to the A/D convertor 44 to execute the conversion of the output voltage signal of the current detection sensor 43 to a digital signal.

The program moves onto a step S152 to store the converted offset current $ILT_0$ corresponding to the offset voltage of the current detection sensor 43 at the sampling time $T_0$ shown in FIG. 5 in a specified address of the RAM 33.

In a step S153, an A/D conversion completion signal is supplied to the A/D convertor 44 and also an A/D conversion restarting time is set in the timer 35 for restarting the A/D conversion when the time elapses to the sampling time $T_1$ from $T_0$ in FIG. 5, and the interruption routine is halted.

The sampling time $T_1$ is set properly in dependency on the characteristics of the injector 12, since the load current $I_{inj}$ shown in FIG. 5 gradually varies until $I_{inj}$ becomes constant current after the pulse signal $P_{inj}$ is ON.

When the sampling time reaches $T_1$, an interruption program starts and A/D conversion of the output voltage signal of the current detection sensor 43 is executed in a step S201.

The program moves on to a step S202 to store the digitized output signal of the current detection sensor 43, that is, the current $ILT_1$ corresponding to the output voltage $V_1$ at the time $T_1$ shown in FIG. 5 in another address of the RAM 33.

In a step S203, the load current IL ($IL=ILT_1-ILT_0$) of the injector 12 is calculated by means of the current $ILT_1$ and the offset current $ILT_0$ stored in the RAM 33 in the step S152 of the interruption program at the sampling time $T_0$. Then, the program moves on to a step S204.

The reference current IR to the injector 12 is read out from the ROM 32, in the S204, to calculate the diagnosis value IDIAG (IDIAG=IL−IR) by means of IR and IL.

The polarity of IDIAG is judged in a step S205. The interruption ends as judged normal if IDIAG is greater than zero, that is, if IL is greater than IR, whereas if IDIAG is judged less than zero, the program moves on to a step S206.

Fault is judged in the S206 and the self-diagnosis circuit 62 stores the trouble data of the faulted injector 12 in the backup RAM 34 and also turns on (or flickers) the self-diagnosis lamp 41 to warn of the occurrence of the fault.

The injector load current IL is, thus, not judged abnormal based on IL=0, even if fuel cutting to the injector 12 is executed, so that the pulse width $P_i$ of the pulse signal $P_{inj}$ is shorter than the period between sampling times $T_0$ and $T_1$ of the current detection sensor 43. Accordingly, erroneous judgement is prevented.

As is described above, according to the present invention, when fuel cutting is executed for an injector, a diagnosis instruction circuit instructs an injector diagnosis circuit to halt fault diagnosis. On the other hand, when the fuel cutting is released, the diagnosis instruction circuit provides signals to the injector diagnosis circuit to execute the diagnosis. Then, a current detection sensor detects a load current of the injector to compare the load current with a preliminary set reference value so as to judge abnormal. By the procedure, erroneous judgement due to the fuel cutting is prevented. Therefore, accurate and reliable fault diagnosis is always conducted.

While the presently preferred embodiments of the present invention have been shown and described, it is to be understood that these disclosures are for the purpose of illustration and that various changes and modifications may be made without departing from scope of the invention as set forth in the appended claims.

What is claimed is:

1. An injector diagnosis system for a motor vehicle having an injector circuit including a plurality of injectors mounted on an engine and a control unit for applying a pulse signal to each of the injectors to inject fuel into the engine at a certain timing, comprising:
   - detecting means for detecting a current flow through one of the injectors to which said pulse signal is applied;
   - calculating means for calculating the load current of the injector on the basis of the current detected by the detecting means;
   - setting means for setting a reference current;
   - diagnosis means for determining an error of the injector circuit when said load current differs from said reference current;
   - sensing means for sensing operating conditions of the engine;
   - judging means responsive to said operating conditions for judging a fuel cut condition of the engine; and
   - instruction means responsive to said fuel cut condition for stopping the determination of said diagnosis means, so as to prevent the judging means from erroneous judgement at the fuel cut condition.

2. The injector diagnosis system according to claim 1, wherein
   said calculating means calculates a difference between an offset current existing in said detecting means when said control unit generates no pulse signal and said current supplied when a specified time passes after generation of a leading edge of pulse said signal so as to obtain said load current of the injector.

3. The injector diagnosis system according to claim 1, wherein
   said setting means sets said reference current on the basis of a battery voltage.

4. The injector diagnosis system according to claim 1 wherein
   said sensing means comprises an idle switch for sensing an idle state of the engine, a vehicle speed sensor for sensing a vehicle speed, a coolant temperature sensor for sensing a coolant temperature and an engine speed sensor for sensing an engine speed.

5. The injector diagnosis system according to claim 4 wherein
   said judging means judges said fuel cut condition by comparing said engine speed with a reference speed depending on said coolant temperature when said idle switch is in an idle position or when said vehicle speed is lower than a predetermined speed.

* * * * *